May 8, 1951     D. A. JACKSON     2,552,430
VAPORIZING FURNACE
Filed Jan. 6, 1947     2 Sheets-Sheet 1
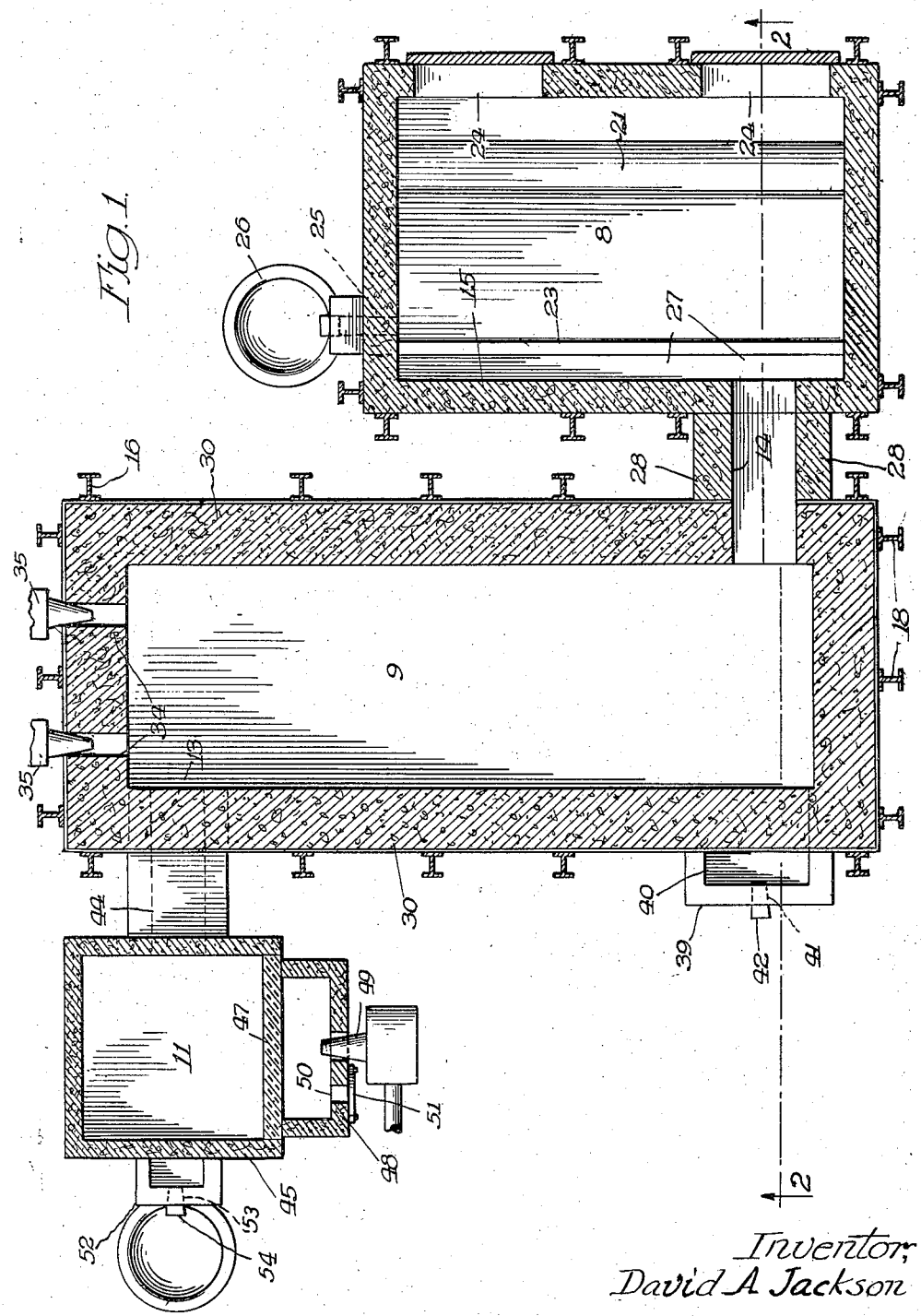
Inventor,
David A Jackson
By Kent W. Wonnell atty

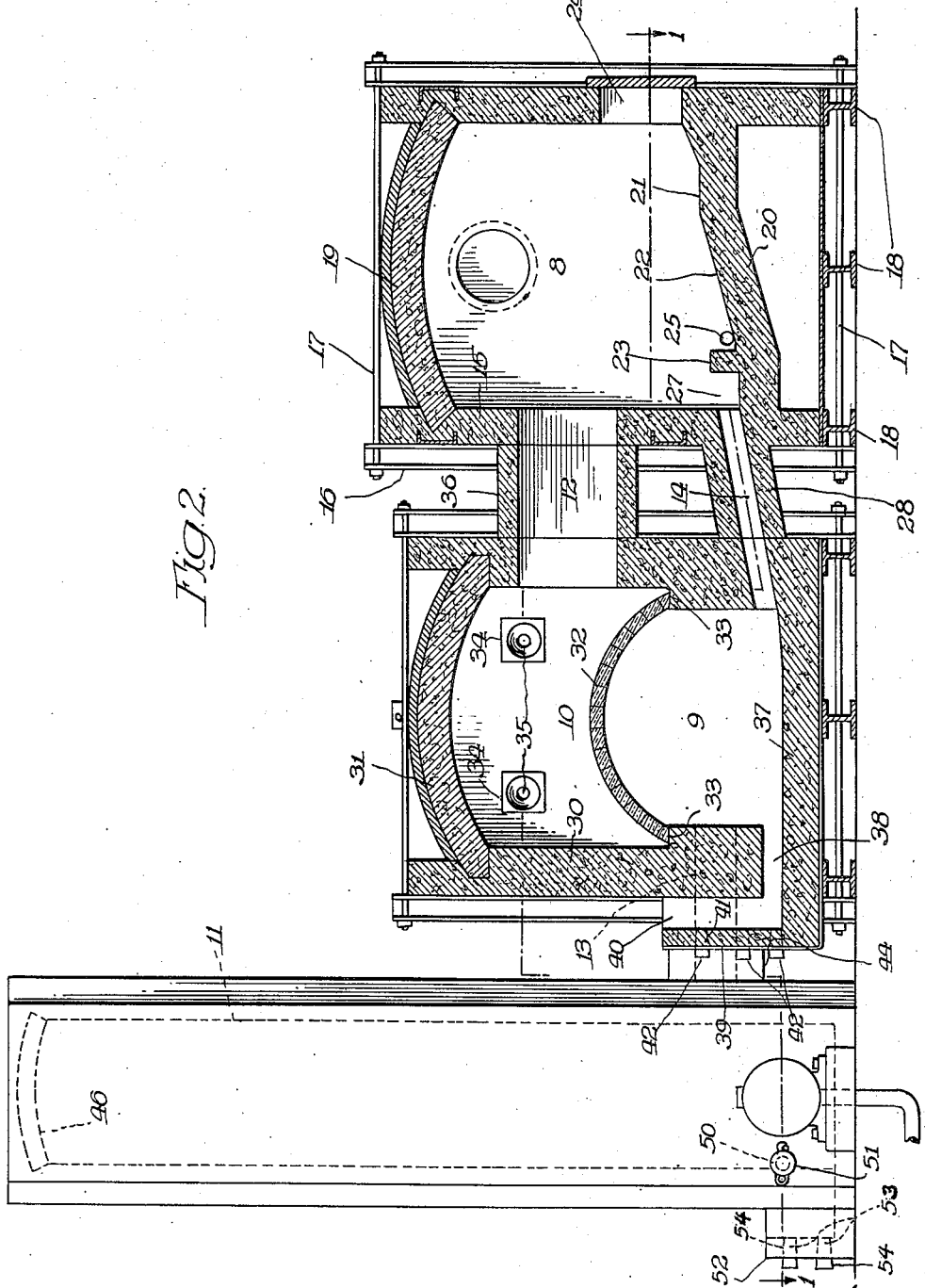

Patented May 8, 1951

2,552,430

UNITED STATES PATENT OFFICE 2,552,430

VAPORIZING FURNACE

David A. Jackson, Chicago, Ill.

Application January 6, 1947, Serial No. 720,354

1 Claim. (Cl. 266—16)

This invention relates in general to a vaporizing furnace for metals and is more particularly described as a furnace for separating zinc and other lighter metals from heavier metals and for vaporizing and refining the zinc.

An important object of the invention is to provide a furnace having means for separating lighter metals from heavier metals and continuously discharging the overflow into a vaporizing chamber.

A further object of the invention is to provide a vaporizing chamber connected with a condensing tower in which the vaporized metal may be condensed and collected.

Still a further object of the invention is to provide means for heating and cooling the condensing tower and for removing the metal from the bottom of the tower.

Other objects of the invention will appear in the specification and will be apparent from the accompanying drawings in which, Fig. 1 is a sectional plan view of a furnace in accordance with the invention as taken approximately on the broken section line 1—1 of Fig. 2; and Fig. 2 is an elevational view partly in section of the furnace as taken approximately on the section line 2—2 of Fig. 1.

In reclaiming, separating and purifying a lighter metal such as zinc from a mixture and combination with other metals, it is desirable first to heat the mixture to such a temperature that the lighter metal may be separated by drawing it off from the top of the other liquid, discharging the heavier liquid from the furnace and continuing the lighter liquid in the furnace for vaporization and condensation.

In the present invention, provision is made for feeding or charging the furnace in batches, or continuously, if desired, removing the heavier metal from the furnace and advancing the lighter metal in a continuous process, finally removing the purified metal.

Referring now more particularly to the drawings, the furnace is represented as built in a number of sections having a preheating and metal separation chamber 8, a vaporizing chamber 9, a heating chamber 10, and a condensing chamber 11. The separation chamber 8 is connected with the heating chamber 10 by a flue 12, the vaporizing chamber is connected with the condensing chamber by a flue 13 and the bottom of the separation chamber is connected with the bottom of the vaporization chamber by an inclined metal passage 14.

The walls 15 of the separation furnace are of any usual or suitable refractory monolithic or brick work structure preferably reinforced at the outside by I beams 16 connected at the tops and bottoms by cross bars 17 and the bottom of the furnace mounted upon I beams 18. At the top of the separator is an arched roof or cover 19 and at the bottom is a floor 20 having a flat receiving or loading platform 21 for the retention of entrained iron and brass inserts sometimes present in various assemblies which are to be melted, and a downwardly inclined portion 22 extending therefrom and terminating in a raised ledge 23. Above the flat loading platform 21 are charging openings 24 with closable doors. The ledge 23 forms a settling basin for the heavy metals which segregate having a normally plugged discharge opening 25 for heavier metals at one end leading to a suitable metal receptacle 26 at the outside of the furnace. This chamber also serves to preheat metal for the vaporizing chamber.

Leading from the discharge side of the ledge 23 within the separation chamber is a passage 27 connecting with the metal passage 14 in a connecting wall section 28 which leads to the vaporizer.

The vaporizer has similar refractory walls 30 supported by I beams 16 and 18 with an upper arched roof or cover 31 and a lower arched partition 32 supported by inwardly extending shoulders 33 of the wall. This partition 32 separates the lower vaporizing chamber 9 from the upper heating chamber 10.

At one end of the heating chamber are openings 34 for fuel feeding nozzles 35 by which the chamber is heated. At the end opposite the nozzles 35 and communicating through the wall 30 is a refractory tube 36 surrounding the heating flue 12. Heat generated in the chamber 10 is conveyed through the partition 32 to the metal which flows down the passage 14 into the bottom of the vaporizing chamber 9.

The vaporizing chamber has a refractory bottom 37 into which the metal to be vaporized flows through the passage 14 after passing over the overflow ledge 23, and extending from the bottom is a draw off passage 38 having an outer wall 39 forming an open well 40 having a plurality of draw off openings 41 closed by plugs 42. This construction is for the purpose of removing soluble metal by-products and discharging any accumulation of such by-products from the vaporizing chamber, and maintaining a metal seal in the chamber.

Also extending from the vaporizing chamber through a refractory cover 44 is the vaporizing flue 13 which leads to the condenser tower 45 which encloses the condenser chamber 11.

This condenser tower is also preferably constructed of a refractory brick work or other material with a closing arch 46 at the top and preferably one of the walls 47 is composed of blocks of silicon carbide or other suitable refractory material having high heat conductivity. Outside of this wall, a heating flue 48 is provided which receives heat from a burner 49 at the lower end thereof so that the inside of the condensation tower may be kept at a fairly constant temperature. For cooling purposes, the flue may have an air inlet opening 50 near the bottom with a movable cover 51 for controlling the opening. A tapping well 52 may be provided at one side of the condensation tower 45 having a plurality of tapping openings 53 and plugs 54 for closing them.

With this construction, various metals may be discharged into the separator upon the loading platform 21 and when suitably heated may be pushed or discharged gradually or will melt or run down into the inclined wall formed by the partition 23 where the heavier metals will be collected at the bottom and may be drawn off, the lighter metals such as zinc discharging over the top of the partition, running down the passageway 14 into the vaporizer chamber 9.

As heat is applied to the zinc in this chamber, it vaporizes and the vapor flows through the flue 13 to the condensation chamber 11 which is maintained at a temperature most conducive to the condensation of the metal vapor which descends or falls in the condenser and is collected and recovered from the bottom thereof. Thus the process is continuous, no heats are lost as the charging, although not shown as continuous, may be continuous through the charging openings 24.

Although a particular form of this invention is herein described, it should be regarded by way of illustration and not as a limitation of the invention, since various changes in the construction, combination and arrangements of the parts may be made without departing from the spirit and scope of the invention.

I claim:

In a vaporizing furnace, a melting chamber having a bottom with a flat charging portion and a downwardly inclined portion extending therefrom and terminating in an overflow ledge extending upwardly from the bottom of the chamber, a vaporizing chamber having an inclined passage leading downwardly thereto from the overflow side of the ledge, a partition at the top of the vaporizing chamber, and a heating chamber at the other side of the partition having a flue for directing the hot gases therefrom to the melting chamber.

DAVID A. JACKSON.

REFERENCES CITED

The following references are of record in the file of this patent:

UNITED STATES PATENTS

| Number | Name | Date |
|---|---|---|
| 232,889 | Hall | Oct. 5, 1880 |
| 319,795 | Cowles et al. | June 9, 1885 |
| 569,537 | Best et al. | Oct. 13, 1896 |
| 716,008 | Dorsenmagen | Dec. 16, 1907 |
| 1,308,879 | Thomson | July 8, 1919 |
| 1,333,721 | Johnson | Mar. 16, 1920 |
| 1,594,348 | Bakken | Aug. 3, 1926 |
| 1,871,657 | Bunce | Aug. 16, 1932 |
| 1,886,937 | Brett | Nov. 8, 1932 |
| 1,938,582 | Davis | Dec. 12, 1933 |
| 2,048,863 | Handwerk et al. | July 28, 1936 |
| 2,061,250 | Perkins | Nov. 17, 1936 |
| 2,163,508 | Burke et al. | June 20, 1939 |
| 2,174,559 | Anderson et al. | Oct. 3, 1939 |
| 2,219,059 | Suchy et al. | Oct. 22, 1940 |